Sept. 15, 1931. J. W. PROCTOR 1,823,165
REEL
Filed June 21, 1929
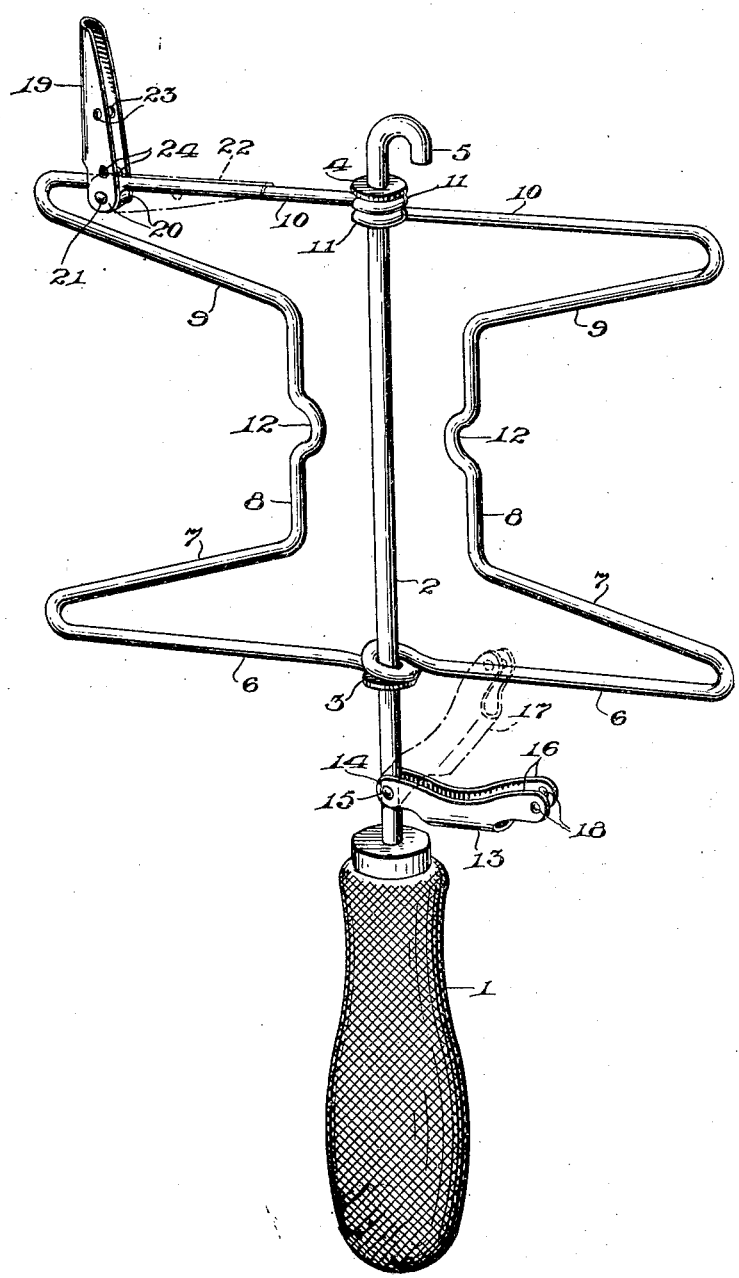
Inventor
John W. Proctor, Patented Sept. 15, 1931

1,823,165

UNITED STATES PATENT OFFICE

JOHN W. PROCTOR, OF PITTSBURGH, PENNSYLVANIA

REEL

Application filed June 21, 1929. Serial No. 372,563.

The object of the invention is to provide improvements in reels such as those which are particularly adapted for use in carrying and from which clothes lines and similar rope, twine, or wire, may be paid out.

Another object has been to design a reel of this character which is capable of being produced at relatively low cost of manufacture, one which presents high efficiency in its operation, one which is adapted for use in many ways and under many conditions, and one which is practically immune against getting out of order or becoming unadjusted from its original condition of manufacture.

A further object has been to provide a reel such that when constructed of relatively heavy wire an extension of the same provides a hook by which the reel can be detachably connected to and supported by the clothes or other line after it has been positioned and tightened.

Still another object has been to provide in a reel of two major parts, one a manually supported shank and the other a relatively rotatable line support, an oscillatory catch or pawl carried by one of said parts and engageable with the other for detachably connecting said parts to prevent relative movement, and in addition thereto providing a lever or plug pivotally carried by a radially outer portion of the line supporting part and manually engageable to effect the rotation of the latter when reeling a rope or wire upon the same, when said catch or pawl is disengaged.

With these and other objects in mind, the present invention comprises further details of construction and operation which are fully brought out in the following description when read in conjunction with the accompanying drawing which is a perspective view of a reel comprising the preferred embodiment of the invention.

Referring to the drawing, the improved reel herein shown comprises any suitable shape of handle 1, from one end of which extends a shank 2, to which are secured spaced washers or the like 3 and 4, while beyond said last-named washer the end portion of said shank is reversely curved to provide a hook 5 of any desired shape.

The line-carrying portion of the reel, or the reel proper, comprises a substantially H-shaped member subdivided briefly as follows. One end portion of said member is bent around the shank 2 adjacent to the fixed washer 3 and provides oppositely extending arms 6. The end portions of said arms are reversely turned to form converging reel sections 7, which merge into spaced parallel, centrally positioned rope-, twine-, or wire-supporting sections 8, which in turn merge into radially outwardly diverging reel sections 9, similar to the sections 7 and between which the rope, twine, or wire is adapted to be wound upon the central parallel sections 8. The outer free ends of said last-named reel sections 9 merge into substantially aligned terminal end sections 10, the adjacent end portions 11 of which are turned about the shank 2 in the neighborhood of the fixed washer 4.

In this manner a reel element is provided which is rotatably mounted upon the manually supported shank 2, and a suitable portion of one of the central parallel sections 8 is concavely curved at 12 to form a convenient point for securing the inner end of a rope or the like to the reel, and thus prevent such end portion from sliding longitudinally upon the parallel supporting members 8. The shank 2 adjacent to the handle 1 is provided with a catch or pawl 13, having a bifurcated end 14 which is oscillatably secured by means of a rivet 15 to said shank, while the opposite or free end portion 16 of said catch is likewise bifurcated to provide spaced extensions, adapted to pass upon the opposite sides of and to receive between them either of the reel sections 6, as shown by the dot-and-dash lines 17, inwardly directed lugs 18 being provided for frictional engagement with said reel section to prevent the accidental disengagement of said catch from said reel section when the same is not desired.

Assuming that a clothes line or the like is wound upon the central parallel sections 8 and between the diverging sections 7 and 9, and which the catch 13 free from engagement with either of the reel arms 6, by manually supporting the reel as a unit by engagement with the handle 1, the clothes line is adapted to be paid off as the reel proper rotates upon the shank 2. Either during or after the attachment of the line to a fixed support, the catch 13 may be moved into the dot-and-dash position 17 and the reel as a unit hung upon the taut line by means of the hook 5.

This operation can be carried out as often as may be desired, but when it is desired to again wind the clothes line or the like upon the reel, a handle element 19 of U-shaped cross section is provided, the same in one direction terminating in a bifurcated portion 20, adapted to receive therebetween the radially outer portion of one of the terminal sections 10 of said reel, said handle being pivotally connected to said reel section by any suitable means such for instance as the rivet 21. Normally, this handle is in the dot-and-dash position 22, lying closely along and partially surrounding the adjacent portion of the reel section 10. In this position the handle is removably secured by means of the inwardly directed lugs 23. However, to extend the handle for operative use, it is manually oscillated into the full-line position shown in the drawings, in which position it is removably retained by means of a second set of inwardly directed lugs 24 which engage the reel section 10, also as shown in the drawing.

In the formation of this device, it is to be understood that the drawing and accompanying description illustrate but one embodiment of the invention, and that any portion or all of the device may be made of any other suitable material than that shown, if desired, and that instead of the circular handle 1 being employed, a handle may be formed by extending and reversely curving the free handle portion of the shank 2, and that in either case a portion or all of said handle may be provided with irregularities or surface knurling in order to assist the operator in firmly gripping the same both while paying out the line and substantially while winding the line upon the reel.

Having thus described my invention, what I claim and desire to protect by Letters Patent of the United States is:—

1. A reel, comprising a shank, an H-shaped section rotatably mounted upon said shank, and said shank being freely extended and reversely curved to form a hook, a hollow handle element pivotally connected to said H-section for manually rotating the same, and means carried by said handle and frictionally engageable with the H-section to yieldingly maintain said handle in extended or retracted position.

2. A reel, comprising a shank, an H-shaped section rotatably mounted upon said shank, and said shank being freely extended and reversely curved to form a hook, a catch to yieldingly secure said H-section to said shank to prevent relative rotation, a handle element pivotally connected to said H-section for manually rotating the same, means carried by said handle and engageable with the H-section to yieldingly maintain said handle in extended or retracted position, and means to prevent movement of said H-section longitudinally upon said shank.

3. A reel, comprising wire formed in a shape similar to the silhouette of an H, a shank, means to prevent longitudinal movement of said wire form upon said shank, and a hollow handle pivotally supported by said wire form to extend into operative position or to be retracted into inoperative position receiving and surrounding the adjacent portion of said wire.

4. A reel, comprising wire formed in a shape similar to the silhouette of an H, a shank, means to prevent longitudinal movement of said wire form upon said shank, a hollow handle pivotally supported by said wire form to extend into operative position or to be retracted into inoperative position receiving and surrounding the adjacent portion of said wire, and lugs carried by said handle and engageable with said wire to yieldingly maintain said handle in either extreme position.

5. In a reel, the combination of a rotatable line-carrying member, with an elongated hollow handle of substantially U-shaped cross section pivotally secured at one end to said member, and provided with a laterally disposed lug frictionally engaging said member, to yieldingly maintain said handle in either extended position, or retracted position receiving the adjacent portion of said member within its U-shaped interior.

In testimony whereof I have affixed my signature.

JOHN W. PROCTOR.